US 6,530,738 B2

(12) United States Patent
Maxwell

(10) Patent No.: US 6,530,738 B2
(45) Date of Patent: Mar. 11, 2003

(54) VEHICLE MOUNTED ARTICLE LOADER APPARATUS

(76) Inventor: Willie R. Maxwell, 525 Hwy. 61 North, Natchez, MS (US) 39120

( * ) Notice: Subject to any disclaimer, the term of this patent is extended or adjusted under 35 U.S.C. 154(b) by 92 days.

(21) Appl. No.: 09/847,724

(22) Filed: May 2, 2001

(65) Prior Publication Data

US 2001/0043852 A1 Nov. 22, 2001

Related U.S. Application Data

(60) Provisional application No. 60/204,538, filed on May 16, 2000.

(51) Int. Cl.$^7$ ................................................ B60P 1/54
(52) U.S. Cl. ....................... 414/462; 212/180; 254/323; 414/540
(58) Field of Search ........................ 212/180; 254/323, 254/325; 414/462, 540

(56) References Cited

U.S. PATENT DOCUMENTS

| | | | | |
|---|---|---|---|---|
| 3,854,168 A | * | 12/1974 | Bradley | 248/514 |
| 4,508,233 A | * | 4/1985 | Helms | 212/294 |
| 4,806,063 A | | 2/1989 | York | 414/462 |
| 4,903,372 A | * | 2/1990 | Jones | 254/325 X |
| 5,419,672 A | | 5/1995 | Poe | 414/540 |
| 5,540,537 A | * | 7/1996 | Welch | 414/462 |
| 5,662,451 A | | 9/1997 | Muzzi et al. | 414/540 |
| 5,791,858 A | | 8/1998 | Sasser | 414/462 |
| 5,971,177 A | * | 10/1999 | Carter | 212/180 X |
| 5,975,831 A | | 11/1999 | Martin | 414/543 |
| 6,202,868 B1 | * | 3/2001 | Murray | 212/294 |
| 6,250,483 B1 | * | 6/2001 | Frommer | 212/180 |

* cited by examiner

*Primary Examiner*—Janice L. Krizek

(57) ABSTRACT

An article loader apparatus is provided for mounting on an all terrain vehicle (ATV) and includes a vehicle mounting assembly for mounting the apparatus onto the vehicle. A strut connector is connected to the vehicle mounting assembly. A strut member is connected to the strut connector for supporting the strut member on the vehicle mounting assembly. A cable guide is connected to a distal end of the strut member. A winch assembly is connected to the vehicle mounting assembly. The winch assembly includes a winch motor and a winch cable controlled by the winch motor. The winch cable is threaded through the cable guide. A stabilizer member connector is connected to a distal end of the strut member, and a pair of stabilizer chains are connected between the stabilizer member connector and the vehicle.

10 Claims, 3 Drawing Sheets

VEHICLE MOUNTED ARTICLE LOADER APPARATUS

CROSS-REFERENCE TO RELATED APPLICATION

This application claims priority based upon my copending Provisional Application Ser. No. 60/204,538, filed May 16, 2000.

BACKGROUND OF THE INVENTION

1. Field of the Invention

The present invention relates generally to vehicle mounted article loader devices, and, more particularly, to a vehicle mounted article loader apparatus especially adapted for use on an all terrain vehicle (ATV).

2. Description of the Prior Art

Hoists that are mounted on a vehicle when needed and removed from the vehicle when not needed are known in the art. In this respect, throughout the years, a number of innovations have been developed, and the following U.S. patents are representative of some of those innovations: U.S. Pat. Nos. 4,806,063, 5,419,672, 5,662,451, 5,791,858, and 5,975,831.

More specifically, both U.S. Patent Nos. 4,806,063 and 5,791,858 disclose vehicle mounted hoists that have a winch mounted on a vertically oriented strut. Because the winches are mounted on the struts, the struts must be equipped with winch attachment devices. To avoid the complexities of struts that require winch attachment devices, it would be desirable if a vehicle mounted hoist were provided with a winch that is not attached to a vertically oriented strut. Also, both U.S. Pat. Nos. 4,806,063 and 5,791,858 disclose vehicle mounted hoists that are mounted on trailer hitches of vehicles. However, some vehicles do not have trailer hitches, so it would be desirable if a vehicle mounted hoist were provided that need not be attached to a trailer hitch.

Both U.S. Pat. Nos. 5,662,451 and 5,975,831 disclose a vehicle mounted hoist that is attached to an all terrain vehicle. In both of these hoists, a vertical strut is provided that is perpendicular to a horizontal plane. By being vertically straight up, a vertical strut does not extend over a side of the vehicle. As a result, it may be difficult for an article that is being hoisted vertically along side of the vehicle, such as a carcass of a game animal, to be lifted straight up at the side of the vehicle before it is moved horizontally to the interior of the vehicle. It would be easier to lift an article vertically at the side of the vehicle if a strut leaned away from the vehicle. Moreover, if a strut leans away from the vehicle, it would be desirable if stabilizers were provided to limit the degree of leaning that the strut undergoes. If leaning struts are not stabilized, a heavy weight on a leaning strut could cause the strut to bend or collapse.

U.S. Pat. No. 5,419,672 may be of interest for its disclosure of a hoist mounted on the tailgate of a pickup truck.

Still other features would be desirable in a vehicle mounted article loader apparatus. For example, preferably strut stabilizers should stabilize a strut under load not only from collapsing horizontally, but also from twisting laterally. If a strut supporting a heavy load were to either collapse horizontally or to twist laterally, then the load may move out of control.

Also, when an article loader apparatus is mounted on a vehicle, it would be desirable if the mounting of the loader apparatus to the vehicle does not result in damage to the vehicle. In this respect, it would be desirable if mounting the loader apparatus to the vehicle does not require drilling of holes in parts of the vehicle.

Thus, while the foregoing body of prior art indicates it to be well known to use vehicle mounted hoists, the prior art described above does not teach or suggest a vehicle mounted article loader apparatus which has the following combination of desirable features: (1) provides a winch that is not attached to a vertically oriented strut; (2) is not attached to a trailer hitch; (3) has a strut that leans away from the vehicle; (4) has stabilizers to limit the degree of leaning that the strut undergoes; (5) stabilizes a strut under load from collapsing horizontally and from twisting laterally; and (6) is mounted to the vehicle without requiring drilling of holes in parts of the vehicle. The foregoing desired characteristics are provided by the unique vehicle mounted article loader apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an article loader apparatus for mounting on a vehicle and includes a vehicle mounting assembly which includes mounting means for mounting the vehicle mounting assembly onto the vehicle. A strut connector is connected to the vehicle mounting assembly. A strut member is connected to the strut connector for supporting the strut member on the vehicle mounting assembly. A cable guide is connected to a distal end of the strut member. A winch assembly is connected to the vehicle mounting assembly. The winch assembly includes a winch motor and a winch cable controlled by the winch motor. The winch cable is threaded through the cable guide. A stabilizer member connecting means is connected to a distal end of the strut member, and a pair of stabilizer members are connected between the stabilizer member connecting means and the vehicle. In a first mode of use, the strut connector leans toward the front of the vehicle causing the strut member to lean toward the front of the vehicle. In a second mode of use, the strut connector leans toward the rear of the vehicle causing the strut member to lean towards the rear of the vehicle. The vehicle can be an all terrain vehicle (ATV). The stabilizer members can be stabilizer chains. The mounting means include a bottom mounting plate, a top mounting plate, and fasteners connected between the bottom mounting plate and the top mounting plate. The fasteners include bolts and nuts. The strut member is a metal pipe. The cable guide means includes a cable guide ring. The stabilizer member connecting means includes a stabilizer connector ring. By using the article loader apparatus, a person can lift a heavy article, such as a deer carcass, into a vehicle without undue strain and effort.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle mounted article loader apparatus which has all of the advantages of the prior art and none of the disadvantages.

It is another object of the present invention to provide a new and improved vehicle mounted article loader apparatus which may be easily and efficiently manufactured and marketed.

It is a further object of the present invention to provide a new and improved vehicle mounted article loader apparatus which is of durable and reliable construction.

An even further object of the present invention is to provide a new and improved vehicle mounted article loader apparatus which is susceptible of a low cost of manufacture with regard to both materials and labor, and which accordingly is then susceptible of low prices of sale to the consuming public, thereby making such vehicle mounted article loader apparatus available to the buying public.

Still yet a further object of the present invention is to provide a new and improved vehicle mounted article loader apparatus which provides a winch that is not attached to a vertically oriented strut.

Still another object of the present invention is to provide a new and improved vehicle mounted article loader apparatus that is not attached to a trailer hitch.

Yet another object of the present invention is to provide a new and improved vehicle mounted article loader apparatus which has a strut that leans away from the vehicle.

Even another object of the present invention is to provide a new and improved vehicle mounted article loader apparatus that has stabilizers to limit the degree of leaning that the strut undergoes.

Still a further object of the present invention is to provide a new and improved vehicle mounted article loader apparatus which stabilizes a strut under load from collapsing horizontally and from twisting laterally.

Yet another object of the present invention is to provide a new and improved vehicle mounted article loader apparatus that is mounted to the vehicle without requiring drilling of holes in parts of the vehicle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
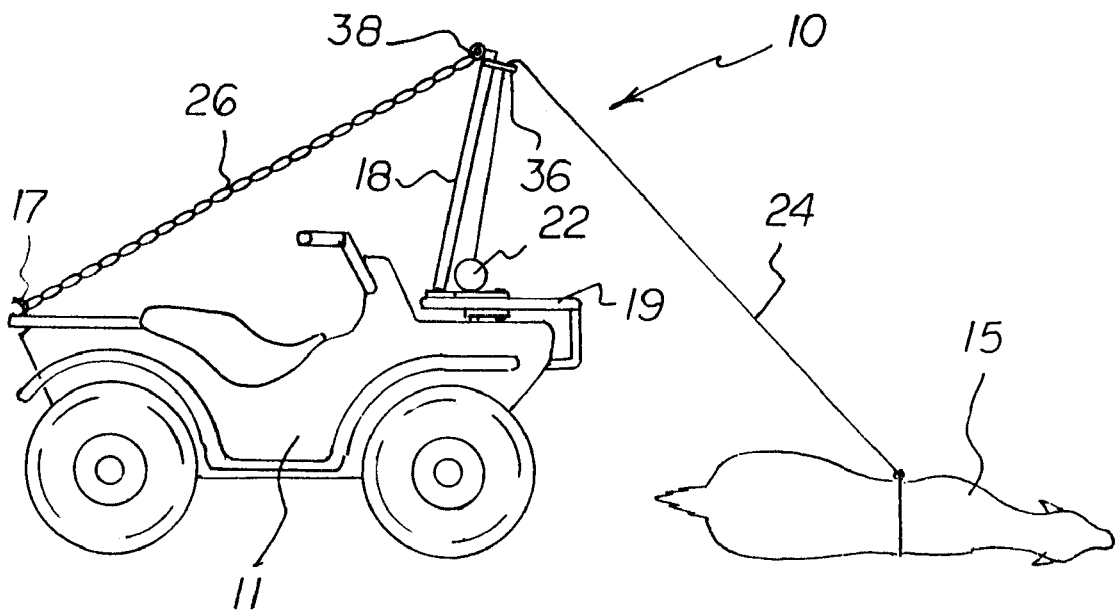
FIG. 1 is a side view showing a preferred embodiment of the vehicle mounted article loader apparatus of the invention, in a first mode of use, for loading a deer carcass onto an ATV.
Figure 2:
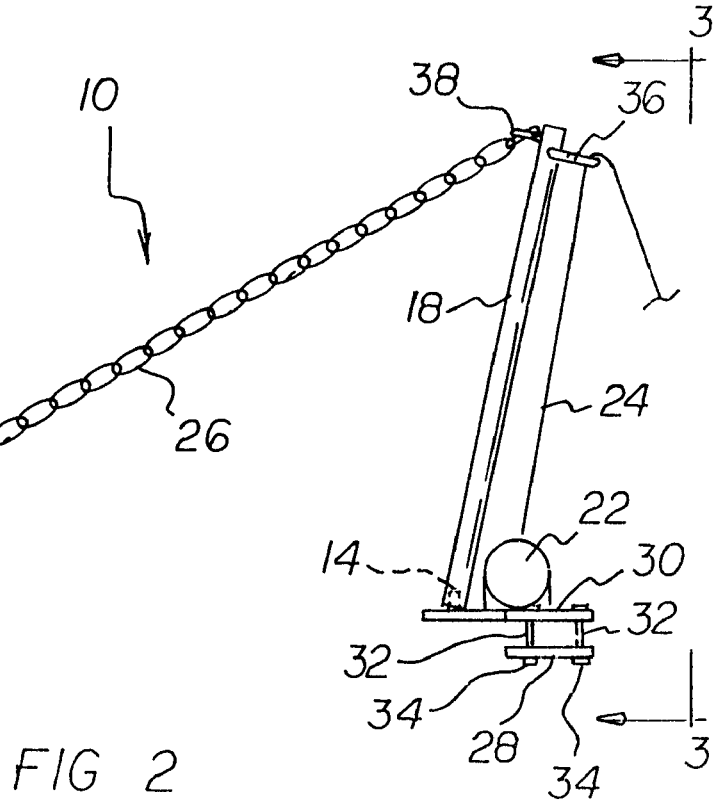
FIG. 2 is a side view of the embodiment of the vehicle mounted article loader apparatus shown in FIG. 1 removed from the ATV.
Figure 3:
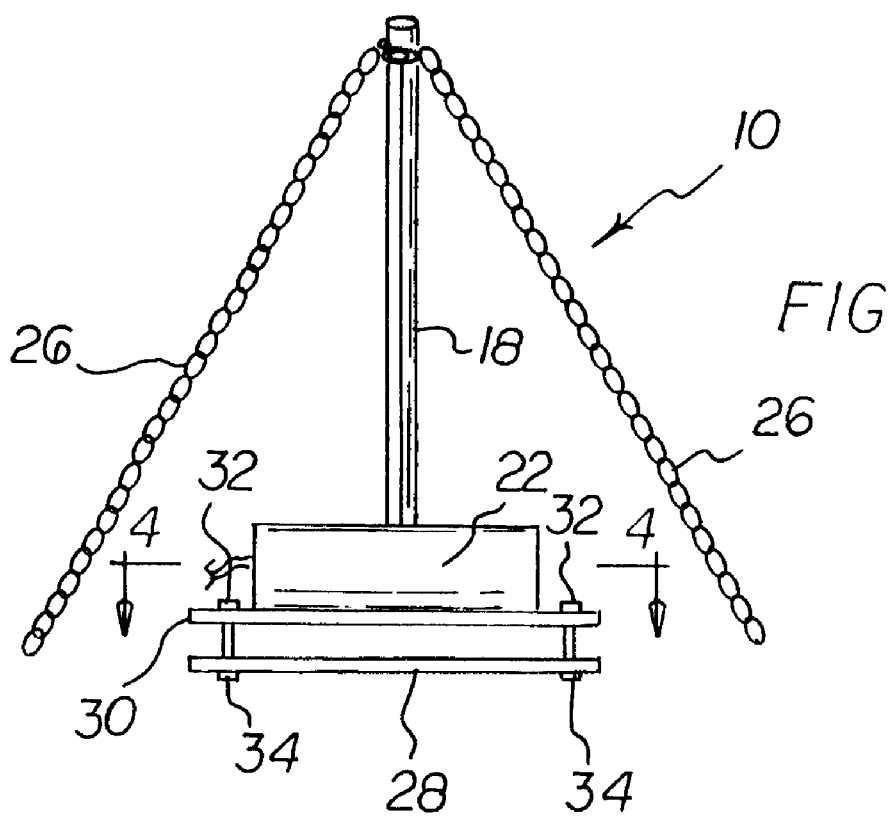
FIG. 3 is a front view of the embodiment of the vehicle mounted article loader apparatus of FIG. 2 taken along line 3—3 thereof.
Figure 4:
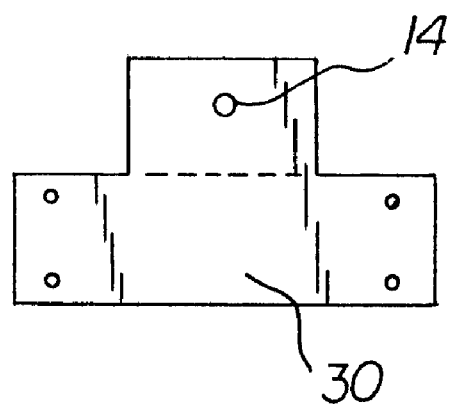
FIG. 4 is a partial top view of the embodiment of the invention shown in FIG. 3 taken along line 4—4 thereof, wherein the winch assembly has been removed.
Figure 5:
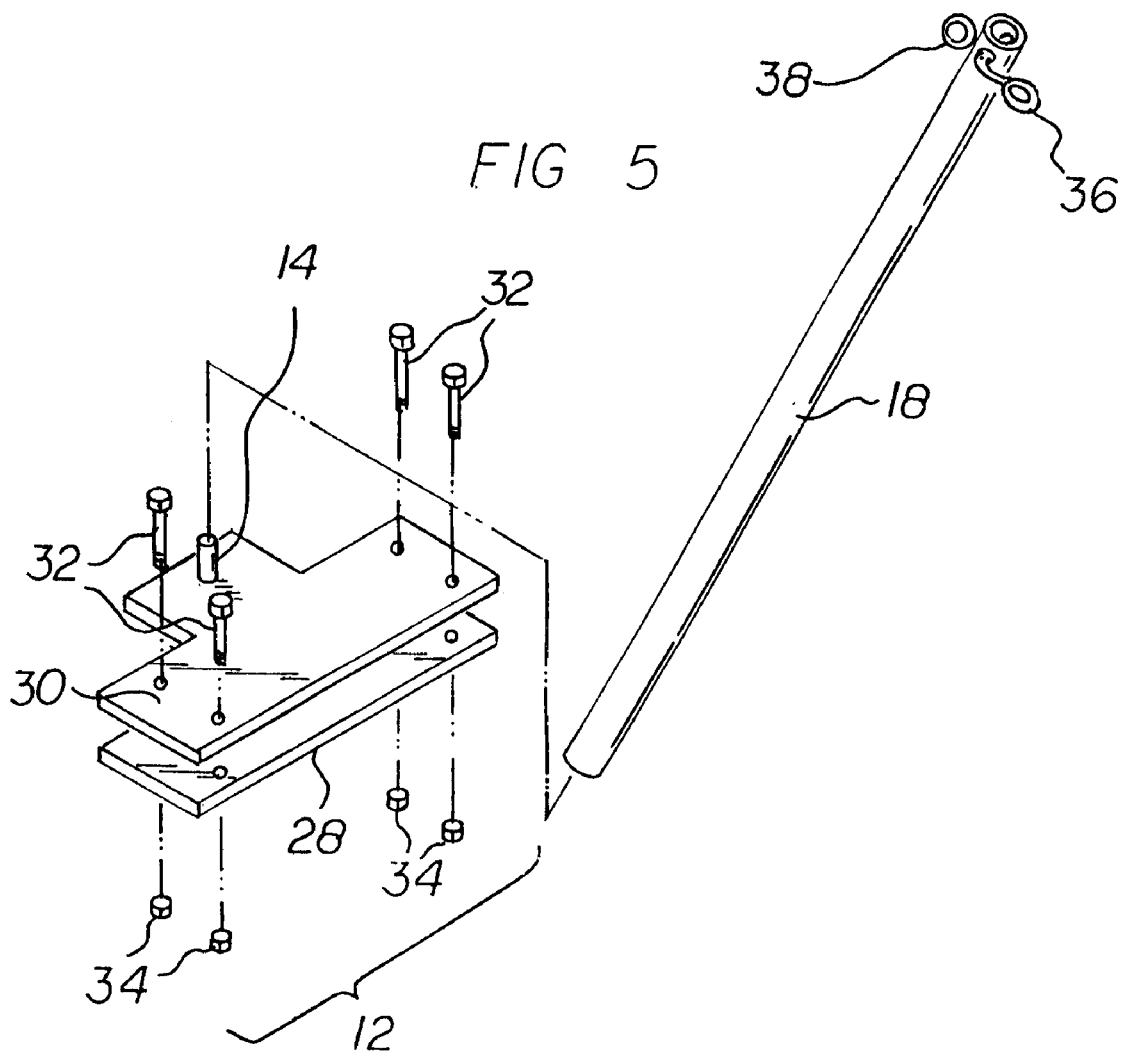
FIG. 5 is an exploded perspective view of the embodiment of the invention shown in FIGS. 1–4, wherein the winch assembly has been removed.

With reference to the drawings, a new and improved vehicle mounted article loader apparatus embodying the principles and concepts of the present invention will be described.

Turning to FIGS. 1–6, there is shown an exemplary embodiment of the vehicle mounted article loader apparatus of the invention generally designated by reference numeral 10. In its preferred form, vehicle mounted article loader apparatus 10 is provided for mounting on a vehicle 11 and includes a vehicle mounting assembly 12 which includes mounting means for mounting the vehicle mounting assembly 12 onto the vehicle 11. A strut connector 14 is connected to the vehicle mounting assembly 12. A strut member 18 is connected to the strut connector 14 for supporting the strut member 18 on the vehicle mounting assembly 12. A cable guide is connected to a distal end of the strut member 18. A winch assembly is connected to the vehicle mounting assembly 12. The winch assembly includes a winch motor 22 and a winch cable 24 controlled by the winch motor 22. The winch cable 24 is threaded through the cable guide. A stabilizer member connecting means is connected to a distal end of the strut member 18, and a pair of stabilizer members 26 are connected between the stabilizer member connecting means and the vehicle 11. In a first mode of use, the strut connector 14 leans toward the front of the vehicle 11.

The vehicle 11 can be an all terrain vehicle (ATV). The stabilizer members 26 can be stabilizer chains 26. The mounting means include a bottom mounting plate 28, a top mounting plate 30, and fasteners 32 connected between the bottom mounting plate 28 and the top mounting plate 30. The fasteners 32 include bolts 32 and nuts 34. The strut member 18 is a metal pipe. The cable guide means includes a cable guide ring 36. The stabilizer member connecting means includes a stabilizer connector ring 38.

As shown in FIG. 1, the article loader apparatus 10 is used in a first mode of use. The article loader apparatus 10 is mounted onto a rack 19 at the front of a vehicle 11 which is an ATV. More specifically, a portion of the rack 19 is sandwiched between the bottom mounting plate 28 and the top mounting plate 30, and the bolts 32 and the nuts 34 are used to secure the bottom mounting plate 28 and the top mounting plate 30 to the rack 19 of the ATV. The strut connector 14 leans forward, and the stabilizer chains 26 extend backward from the stabilizer connector ring 38 to the rear of the ATV, and the distal ends of the stabilizer chains 26 are connected to hooks 17 at the rear of the ATV. One end of the winch cable 24 is tied to a deer carcass 15. The deer carcass 15 is pulled up onto the front of the ATV when the winch motor 22 is turned on.

Figure 6:
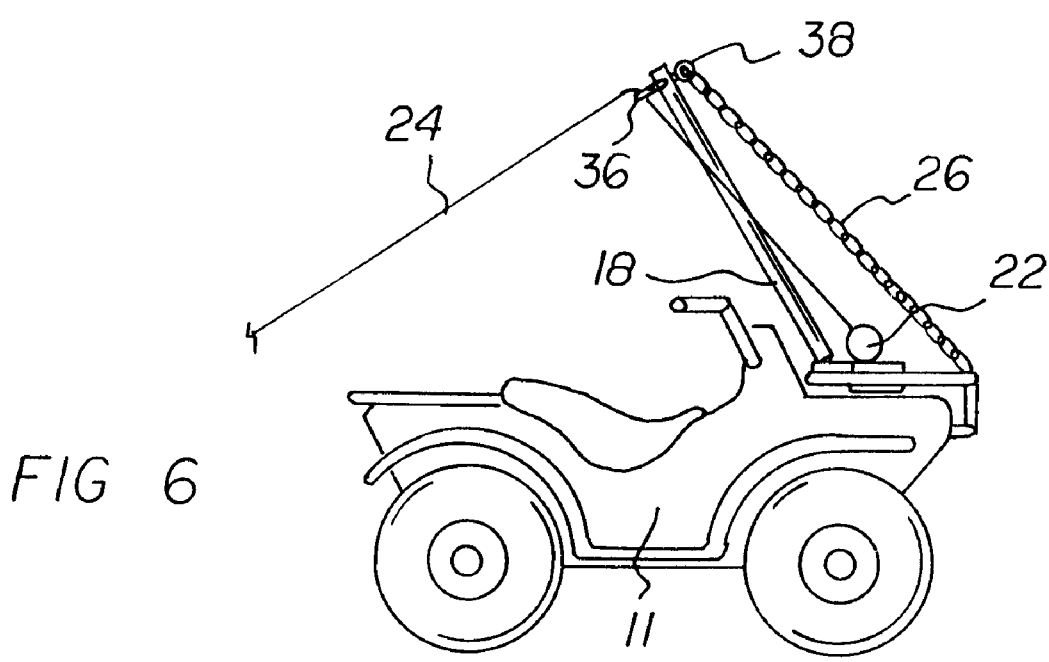
FIG. 6 is a side view showing the embodiment of the invention shown in FIG. 1 in a second mode of use.

Turning to FIG. 6, a second mode of using the invention is shown. Reference numerals are shown that correspond to like reference numerals that designate like elements shown in the other figures. In the second mode of use, the strut connector 14 leans toward the rear of the vehicle 11. To use the article loader apparatus 10 in the second mode of use, the stabilizer chains 26 extend from the stabilizer connector ring 38 to a front portion of the ATV. An end of the winch cable 24 is tied to a deer carcass (not shown in FIG. 6) that is located on the ground to the rear of the ATV. When the winch motor 22 is turned on, the deer carcass is pulled up onto the rear of the ATV.

The length of the strut member 18 is selected to be in accord with the size of the article that is to be lifted onto the vehicle 11. For example, for a deer carcass 15, a suitable length of the strut member 18 is 42 inches long. By using the article loader apparatus 10, a person can lift a heavy article, such as a deer carcass 15, into a vehicle 11 without undue strain and effort.

The components of the vehicle mounted article loader apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved vehicle mounted article loader apparatus that is low in cost, relatively simple in design and operation, and which advantageously provides a winch that is not attached to a vertically oriented strut. With the invention, a vehicle mounted article loader apparatus is provided which is not attached to a trailer hitch. With the invention, a vehicle mounted article loader apparatus is provided which has a strut that leans away from the vehicle. With the invention, a vehicle mounted article loader apparatus is provided which has stabilizers to limit the degree of leaning that the strut undergoes. With the invention, a vehicle mounted article loader apparatus is provided which stabilizes a strut under load from collapsing horizontally and from twisting laterally. With the invention, a vehicle mounted article loader apparatus is provided which is mounted to the vehicle without requiring drilling of holes in parts of the vehicle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An article loader apparatus for mounting on a vehicle, comprising:

a vehicle mounting assembly which includes mounting means for mounting said vehicle mounting assembly onto the vehicle, a strut connector connected to said vehicle mounting assembly, a strut member connected to said strut connector for supporting said strut member on said vehicle mounting assembly, cable guide means connected to a distal end of said strut member, a winch assembly which includes a winch motor connected to said vehicle mounting assembly and a winch cable controlled by said winch motor, wherein said winch cable is threaded through said cable guide means, stabilizer member connecting means connected to the distal end of said strut member, and a pair of stabilizer members connected between said stabilizer member connecting means and the vehicle.

2. The apparatus of claim 1 wherein said strut connector leans toward the front of the vehicle.

3. The apparatus of claim 1 wherein the vehicle is an all terrain vehicle (ATV).

4. The apparatus of claim 1 wherein said stabilizer members are stabilizer chains.

5. The apparatus of claim 1 wherein said mounting means include:

a bottom mounting plate, a top mounting plate, and fasteners connected between said bottom mounting plate and said top mounting plate.

6. The apparatus of claim 5 wherein said fasteners include bolts and nuts.

7. The apparatus of claim 1 wherein said strut member is a metal pipe.

8. The apparatus of claim 1 wherein said cable guide means includes a cable guide ring.

9. The apparatus of claim 1 wherein said stabilizer member connecting means includes a stabilizer connector ring.

10. The apparatus of claim 1 wherein said strut connector leans toward the rear of the vehicle.

* * * * *